(12) United States Patent
Farnworth et al.

(10) Patent No.: US 6,329,095 B1
(45) Date of Patent: Dec. 11, 2001

(54) TAB FOR ZINC/AIR CELL

(75) Inventors: David Farnworth, Westport; William I. Clark, Thomaston; George I. Tay, Southbury; Robb K. Siefert, Trumbull, all of CT (US)

(73) Assignee: The Gillette Company

( * ) Notice: Subject to any disclaimer, the term of this patent is extended or adjusted under 35 U.S.C. 154(b) by 0 days.

(21) Appl. No.: 09/691,977

(22) Filed: Oct. 19, 2000

(51) Int. Cl.[7] .................................................... H01M 2/04

(52) U.S. Cl. ............................ 429/48; 429/65; 429/98; 429/163

(58) Field of Search .......................... 381/69.2; 429/229, 429/53, 65, 98, 48, 153, 163, 164, 172, 177, 27, 34, 35

(56) References Cited

U.S. PATENT DOCUMENTS 4,380,576   4/1983   Yoshida .

OTHER PUBLICATIONS

Prior art product sample: Duracell 312 Hearing Aid Battery (4–pack) (1999).

Primary Examiner—Gabrielle Brouillette
Assistant Examiner—M. Wills
(74) Attorney, Agent, or Firm—Barry D. Josephs; Paul I. Douglas; Thomas G. Krivulka

(57) ABSTRACT

A removable tab for metal/air cell, particularly miniature zinc/air button cells which have a principal use as hearing aid batteries. The tab covers air holes in the surface of the cell. The tab has a stiff elongated member that has an extended portion which forms a handle for removing the tab from the cell in order to activate the cell. The tab also comprises a resilient material, preferably a polymeric foam. A portion of the resilient material is adhered to at least a portion of one side of the stiff elongated member and another portion of the resilient material is adhered to cover air holes in the cell surface. A polymeric film can be inserted between the foam and cell surface. The resilient material conforms better to the cell surface which can typically have curved, grooved or depressed regions in addition to the air holes. The resilient material provides more uniform adhesion of the tab to the cell surface with releasable pressure sensitive adhesives.

23 Claims, 4 Drawing Sheets

TAB FOR ZINC/AIR CELL

FIELD OF THE INVENTION

The invention relates to removable tabs which cover air holes on the cathode casing of a metal/air cell, particularly the air holes of a miniature zinc/air cell.

BACKGROUND OF THE INVENTION

Zinc/air cells are typically in the form of button cells which have particular utility as batteries for electronic hearing aids including programmable type hearing aids. Such miniature cells typically have a disk-like cylindrical shape of diameter between about 4 and 12 mm and a height between about 2 and 6 mm. The miniature zinc/air button cell typically comprises an anode casing (anode cup), and a cathode casing (cathode cup). The anode casing and cathode casing typically each have a closed end and an open end. An electrical insulating material can be placed around the outside surface of the anode casing. After the necessary materials are inserted into the anode and cathode casings, the open end of the anode casing is typically inserted into the open end of the cathode casing and the cell sealed by crimping. The cathode casing can typically be of nickel plated steel or nickel plated stainless steel, for example, with the nickel plate forming the cathode casing's outside surface and stainless steel forming the casing's inside surface. The cathode casing characteristically has at least one, and more usually a plurality of small air holes in the surface at the closed end thereof. This end typically also forms the cell's positive terminal.

A removable tab can be adhered to the cell surface containing the air holes. The tab is conventionally formed of a single material, such as a plastic film which is coated on one side with a releasable pressure sensitive adhesive. The tab is pressed onto the cell surface to cover the air holes therein. The tab has a small extended portion which the user grasps by finger tip when it is desired to remove the tab from the cell. Conventional tabs are designed with the extended free portion for grasping being very small, for example, about ⅛ to ¼ inch. It was generally thought that such small tabs are adequate. However, user satisfaction surveys conducted by the Applicant revealed that many elderly users or dexterity impaired users can have some difficulty grasping the conventional tabs. However, larger tabs if formed in the same manner as conventional tabs, are more apt to be dislodged during handling and shipment of the cells, thereby possibly causing premature activation of some of the cell.

Accordingly, it is desirable to provide removable tabs for metal/air cells, particularly miniature zinc/air cells, which tabs are easier to grasp and remove from the cell.

It is also desirable to provide removable tabs that adhere better and more uniformly to the metal/air cell surface to reduce the chance of air seepage or premature dislodgment from the cell.

SUMMARY OF THE INVENTION

Metal air cells, particularly miniature zinc/air button cells have a removable tab covering air holes in the cell surface. The air holes typically are formed in the closed end of the cathode casing of the cell, which also forms the cell's positive terminal. Such cells are commonly employed as batteries for hearing aids, including programmable hearing aids. The cells typically have a disk-like cylindrical shape (button cells), having a diameter between about 4 and 12 mm and a height between about 2 and 6 mm.

An aspect of the invention is directed to providing a improved removable tab which adheres more uniformly to the cell's surface containing the air holes thereby tightly covering the air holes until the cell is ready for use. The improved tab comprises an elongated member which forms the tab body. The elongated member is desirably fairly rigid or stiff, that is, remains straight and does not bend under its own weight. Such elongated member can be formed, for example, of polyester material. The tab is characterized by having a portion of the tab covering and adhering to the cell (the contact portion) and a remaining portion forming an integral handle which remains unattached to the cell. The tab of the invention is longer than conventional, thus providing a longer handle portion. The handle portion of the tab extends preferably between about ½ and ¾ inches (12.7 mm and 19.1 mm) from the edge of the cell closest to the handle. The tab having such extended handle allows the user to more readily grasp the tab by its handle and remove it from the cell thereby exposing the air holes and activating the cell. The extended tab of the invention provides an advantage particularly to elderly or dexterity handicapped users who may have difficulty grasping conventional tabs. Additionally, the extended tab of the invention allows for stronger adhesive bonding between the tab and cell surface containing the air holes. This is possible because less force is needed to remove the tab from the cell due to the leveraged effect of the extended tab.

Another aspect of the invention is directed to providing a layer of resilient material to the tab in the area of contact between the tab and cell surface containing the air holes. The resilient material can be an elastomeric or spongy material. The resilient material is preferably a polymeric foam material which can be coated with a permanent adhesive on one side to permanently adhere the resilient material to the underside of the tab body at the contact tab contact end. The exposed surface of the resilient material can then be coated with a releasable pressure sensitive material. The contact end of tab is pressed onto the cell surface containing the air holes with the releasable adhesive providing a tight adhesive seal between the tab and cell surface. The polymeric foam can be predominantly open cell or closed cell, preferably closed cell foam. In particular, the additional layer can be polymeric foam such as a polyethylene foam. The polymeric foam desirably has a thickness of between about 0.010 and 0.040 inches (0.25 and 1.02 mm), preferably between about 0.015 and 0.040 inches (0.38 and 1.02 mm). The foam material, particularly, a polyethylene foam allows the tab contact portion to conform more readily to the cell end surface which can be flat or outwardly curved or contain grooves or other surface irregularities in addition to the air holes. The foam material allows the tab contact area having pressure sensitive adhesive applied thereto to be enlarged to also cover depressed or beveled annular rings surrounding the cell end surface. Thus, the addition of a resilient foam layer generally provides closer conformity and more uniform adhesion of the tab to the cell surface containing the air holes.

In another aspect of the invention a portion of the surface of polymeric foam layer can be adhered to the underside of the elongated tab body and a polymeric film can be adhered on one side to another portion of the surface of the foam layer so that the foam layer is between the tab body and polymeric film. The opposite side of the polymeric film can in turn be coated with a releasable pressure sensitive adhesive. When the tab is applied to the cell, the polymeric film adheres to the cell surface and together with the polymeric foam covers the air holes. A tight seal over the air holes is thereby provided. When the tab is lifted, it releases cleanly without leaving residue behind on the cell surface.

BRIEF DESCRIPTION OF THE DRAWINGS

The invention will be better understood with reference to the drawings in which.

DETAILED DESCRIPTION

Figure 1:
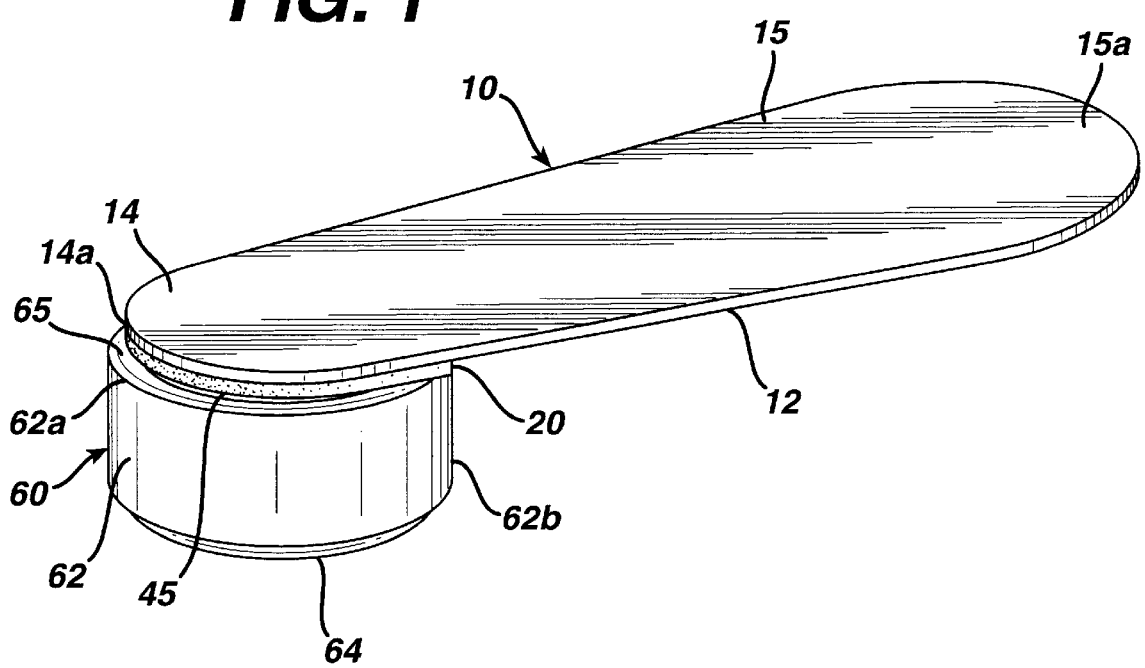
FIG. 1 is an isometric view of a removable tab of the invention adhered to a miniature zinc/air cell to cover the air holes in the cell casing.

A preferred embodiment of the invention is illustrated in FIG. 1. An extended tab 10 of the invention is shown attached to an end of a miniature metal/air cell 60. The metal air cell 60 of FIG. 1 is shown without the tab in FIG. 1A. The metal/air cell 60 can be a conventional miniature zinc/air button cell of the type commonly used as a hearing aid battery. Such zinc/air cell commonly has an cathode casing 62 which forms the body of the cell and an anode casing 64 which is inserted into the cathode casing through an open end 68 and sealed. The cathode casing 62 has an integrally formed closed end 63 with a plurality of air holes in its surface. The cathode casing 62 including closed end 63 can typically be of nickel plated steel or nickel plated stainless steel, for example, with the nickel plate forming the cathode casing's outside surface and stainless steel forming the casing's inside surface. The total wall thickness of the cathode casing 62 can be desirably between about 0.001 inches (0.0254 mm) and 0.015 inches (0.38 mm). The anode casing 64 can also be of nickel plated stainless steel, typically with the nickel plate forming the casing's outside surface. The anode casing can desirably be of a triclad material composed of stainless steel having an outer layer of nickel and an inner layer of copper. The total wall thickness of the anode casing 64 composed of the triclad material can be desirably between about 0.001 inches (0.0254 mm) and 0.015 inches (0.38 mm). There can be an a layer of air filter material and cathode material comprising manganese dioxide within the cathode casing abutting the air holes. The cathode material typically comprises manganese dioxide which can function primarily as catalytic material facilitating the discharge reaction between anode active material and oxygen entering into the cell through the air holes 66. The manganese dioxide can also be partially dischargeable. An anode casing 64 filled with anode active material, typically comprising particulate zinc can be inserted into the open end of the cathode casing 62. The anode active material typically also comprises alkaline electrolyte, preferably an aqueous solution of potassium hydroxide. There can be an electrolyte permeable separator within the cell between the cathode material and the anode material. There can also typically be electrical insulator material such as polypropylene or nylon between the inner surface of the cathode casing 62 and the anode casing 64. The peripheral edge 68 of the cathode casing 60 can then be crimped over the edge 65 of the anode casing 64 to tightly seal the cell.

Figure 1A:
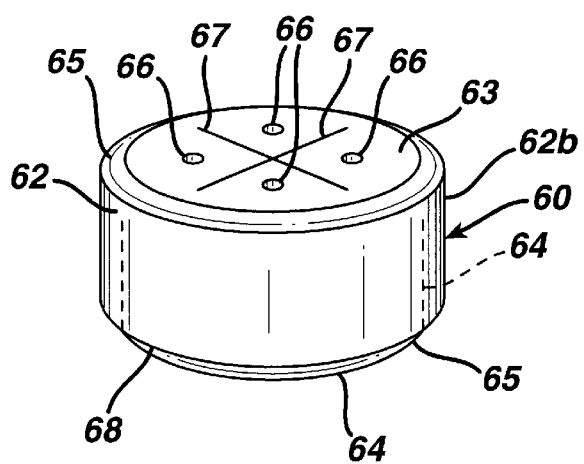
FIG. 1A is an isometric view of the zinc air cell of FIG. 1 without the tab.

Specific constructions and chemical compositions of such conventional zinc/air cells having particularly utility as hearing aid batteries are well know in the art. For example, discussion of specific chemistries are recited in U.S. Pat. No. 4,585,710, herein incorporated by reference. A representative cell construction of a miniature zinc/air button cell is shown in U.S. Pat. No. 3,897,265, herein incorporated by reference. It will be pointed out, however, that a salient feature of such cells is that there are of air holes in the cathode casing 62 at the closed end 63 of the cell. The air holes are typically formed within a raised surface 63 at the cathode end of the cell. The raised end surface 63 with air holes 66 therethrough is desirably flat but can also have some outward curvature. Protruding end surface 63 typically forms a dome which becomes the cell's positive terminal. There can be other irregularities such as grooves, depressions or etched lines 67 on the protruding end surface 63. Such groove lines 67 can divide the cell end surface 63 into sections as shown in FIG. 1A. They help to assure that the plurality of air holes 66 formed during the manufacturing process are properly spaced, typically at equidistance from each other. The protruding surface 63 (positive terminal) is typically surrounded by a beveled or depressed annular surface 65. This that the surface 63 protrudes somewhat form the cell surface thereby assuring proper contact with the terminal of a device such as a hearing aid, which the cell is intended to power. Such miniature zinc/air cells have a disk-like cylindrical shape as shown in FIG. 1A and diameter between about 4 and 16 mm, typically between about 4 and 12 mm and a height between about 2 and 9 mm, typically between about 2 and 6 mm. They are commercially available in standard sizes for hearing aid application. These common commercially recognizable hearing aid battery sizes include size 10 (5 mm diameter by 3.5 mm height), size 13 (7 mm diameter by 5 mm height), size 312 size (8 mm diameter by 3 mm height) and size 675 (8 mm diameter by 3 mm height.) The miniature zinc/air cell typically has an operating load voltage between about 1.1 volt to 0.2 volt. The cell typically has a substantially flat discharge voltage profile between about 1.1 and about 0.9 volt whereupon the voltage can then fall fairly abruptly to a cut-off of about 0.2 volt. The cell can be discharged at a rate between about 4 and 15 milliAmp, or typically with a resistance load of between about 75 and 275 Ohm. This makes the cells ideally suitable as hearing aid batteries. The term "miniature cells" or "miniature button cells" as used herein is intended to include such small size button cells having th e disk-like cylindrical shape shown in FIG. 1A, but is not intended to be restricted thereto, since other shapes and sizes for small zinc/air cells are possible. Also, although the miniature button cells referenced herein have a principal application as batteries for hearing aids, they are not intended to be limited to such application.

An adhering tab 10 can be used to cover the air holes until the cell is ready for use. One end 14 of the tab can be covered with a pressure sensitive adhesive which allows the tab to be removable. The tab 10 keeps the cell contents from drying out and prevents the cell from becoming prematurely activated When it is desired to activate the cell, the user grasps a protruding portion 15 of the tab, and simply peels the tab away from the air holes 66. Conventional tabs for such miniature cells protrude only slightly, typically between about ⅛ to ¼ inches from the cell surface requiring that the user grip the tab by finger tip in order to remove it. It has been determined that many users of such hearing aid batteries are elderly or have difficulty grasping such conventional tabs.

Figure 2:
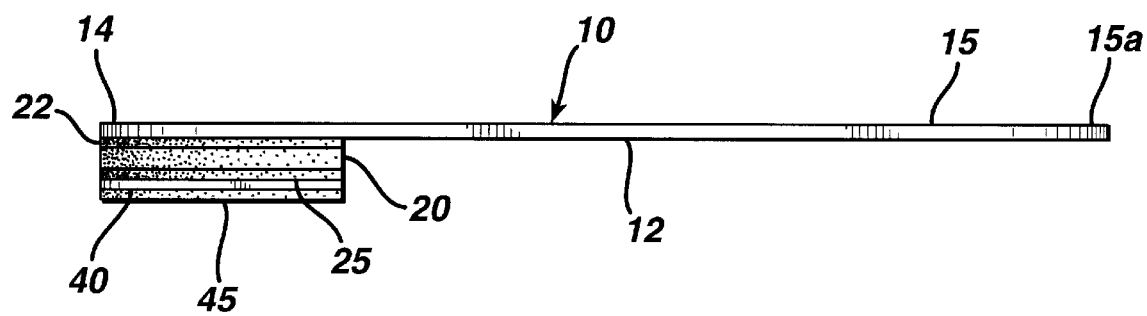
FIG. 2 is an elevation view of the removable tab shown in FIG. 1.
Figure 3:
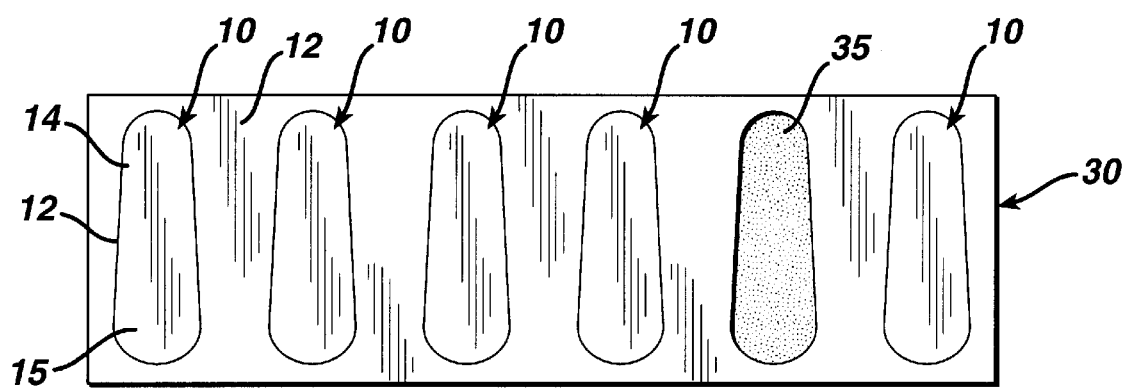
FIG. 3 is a planar view of a strip of material from which the handle portion of the tab can be cut.

It has been determined that if the tab length is extended to provide a longer protruding portion or handle, elderly or handicapped users can grip the tab more firmly and pull the tab away from the cell more easily than with conventional tabs. The tab embodiment shown in FIGS. 1 and 2 illustrates one preferred configuration of an extended tab of the invention. In this embodiment the handle portion 15 extends more than conventional. For example, if the tab of configuration shown in FIG. 1 is designed to fit over a standard 675 zinc/air button cell, the handle portion of the tab, that is, the portion 15 extending perpendicularly from cell edge 62b is desirably between about ½ and ¾ inches (12.7 mm and 19.1 mm), preferably about ⅝ inches (15.9 mm). (The 675 cell has the disk-like shape shown in FIG. 1A with overall dimensions of 11 mm diameter and 5 mm height.) In such embodiment the portion 14 of the tab covering the cell is at least large enough to cover cell end surface 63 containing the air holes 66 and preferably is about equal to the cell diameter of about 11 mm. The overall tab length consists of the length of end portion 14 plus the length of handle portion 15. Thus, the tab desirably has an overall length between about 0.90 and 1.20 inches (22.8 mm and 30.5 mm), preferably about 1.0 inches (25.4 mm). In the tab embodiment shown in FIG. 1 the tab is flared outwardly from the end 14 covering the cell to the end 15A of the handle portion 15. Thus the width of the tab at the handle end 15a is greater than the width at end 14. The tip 14a of tab end portion 14 preferably does not extend beyond the cell edge 62a. The overall tab length consists of the length of end portion 14 plus the length of handle portion 15.

Figure 4:
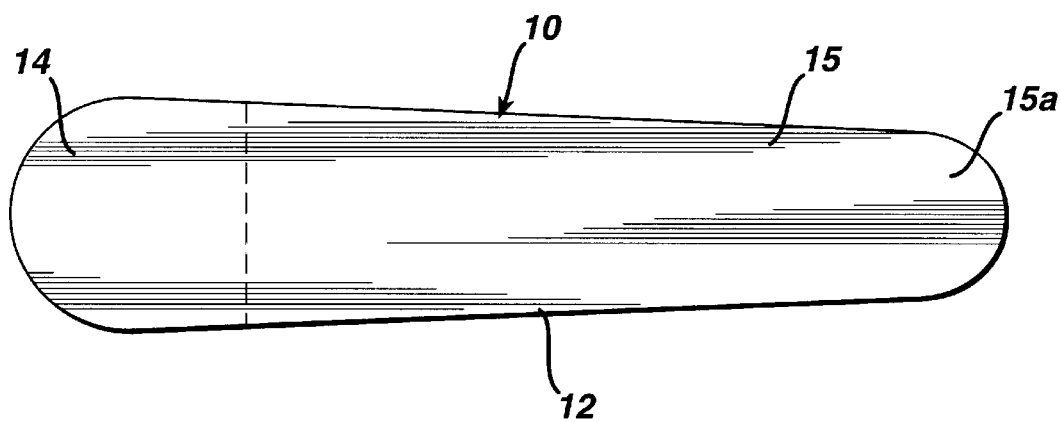
FIG. 4 is a planar view of another embodiment of the removable tab of the invention.
Figure 5:
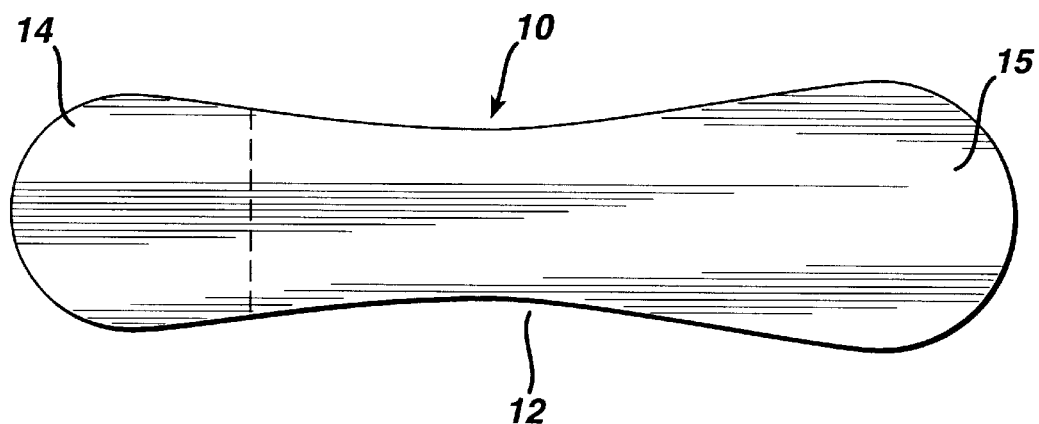
FIG. 5 is a planar view of another of the removable tab of the invention.

Other preferred configurations for the extended tab of the invention are shown in FIGS. 4 and 5. The tab configuration shown in FIG. 4 is similar to that shown in FIG. 1 except that the handle portion 15 is flared inwardly from the portion 14 covering the cell. That is, the width of the tab handle end 15a is narrower than the width of the portion 14 covering the cell. In the tab configuration shown in FIG. 5 the longitudinal edges of the tab can be contoured inward forming a concave shape. The tab is otherwise similar to that shown in FIG. 1 wherein the handle end portion 15a has a greater width than the width of the tab portion 14 covering the cell.

The tab embodiments shown in FIGS. 4 and 5 can desirably be designed so that the handle extends between about ½ and ¾ inches (12.7 mm and 19.1 mm) from the body 62 of the cell when it is desired to apply the tab to standard 675 or 312 size zinc/air button cells. For example, if the tab embodiment shown in FIGS. 4 and 5 are applied to a 312 size cell, the tab desirably has a handle portion 15 extending perpendicularly from the cell edge 62b being about ½ and ¾ inches (12.7 mm and 19.1 mm), preferably about ⅝ inches (15.9 mm). (The 312 cell has a diameter of about 8 mm and height of about 3 mm.) In such embodiment the portion of the tab covering the cell is at least large enough to cover cell end surface 63 containing the air holes 66 and preferably is about equal to the cell diameter of about 8 mm (0.32 inches). The total length of the tab consists of the length of end portion 14 plus the length of handle portion 15. Thus, for application to a size 312 cell, the total tab length is desirably between about 0.8 and about 1.10 inches (20.3 mm and 27.9 mm).

Similarly, if the tab embodiments shown in FIGS. 4 and 5 are applied to a 675 size cell, the handle portion 15 of the tab extending perpendicularly from the cell edge 62b is desirably between about ½ and ¾ inches (12.7 mm and 19.1 mm), preferably about ⅝ inches (15.9 mm). In such embodiment the portion of the tab covering the cell is at least large enough to cover cell end surface 63 containing the air holes 66 and preferably is about equal to the cell diameter of 11 mm. (The 675 cell has the disk-like shape shown in FIG. 1A with overall dimensions of 11 mm diameter and 5 mm height.) The total length of the tab consists of the length of end portion 14 plus the length of handle portion 15. Thus, the tab desirably has an overall length between about 0.90 and 1.20 inches (22.9 mm and 30.5 mm).

Similarly, the tab configurations shown in FIGS. 1, 4 and 5 can be applied to smaller size miniature zinc/air cells. For example, they can be applied to size 10 (5 mm diameter by 3.5 mm height) and size 13 (7 mm diameter by 5 mm height) miniature zinc/air cells. The tabs desirably have a diameter at one end (end 14) which is at least large enough to cover cell end surface 63 containing the air holes 66 (FIG. 1A) and preferably is about equal to the diameter of the cell. The handle portion 15 of the tab desirably extends perpendicularly between about ½ and ¾ inches (12.7 mm and 19.1 mm), preferably about 5/8 inches (15.9 mm) from the cell edge 62b. The overall tab length consists of the length of end portion 14 plus the length of handle portion 15. Thus, for application to size 10 cell the overall length of the tab is thus desirably between about 17.7 mm and 24.1 mm. For application to size 13 cell, the overall length of the tab is thus desirably between about 19.7 mm and 26.1 mm.

The extended tabs of the invention have proved to be easier for users to grasp and remove than conventional tabs for miniature zinc/air cells. It has also been determined desirable to make the handle portion 15 stiff. This also makes it easier for users to grasp and remove the tab from the cell. The tab 10 of the invention comprises an elongated member 12 which forms the tab body. The elongated member 12 (tab body) is desirably formed of stiff material. The elongated member 12 (tab body) consist of integral end portion 14 and integral handle portion 15 above described. Body 12 is desirably formed of stiff or fairly rigid material, preferably of polyester having a thickness of about 0.010 inches (0.254 mm). Such tab body 12 can be used with conventional pressure sensitive adhesives for attaching end portion 14 to the cell surface 63.

Thus the extended tab embodiments of the invention shown in FIGS. 1, 4 and 5 can be employed by fabricating the tab having a stiff body 12 of polyester (0.010 inches thick) and coating the underside of end portion 14 with an adhesive, preferably a releasable pressure sensitive adhesive 25. Conventional polyacrylate releasable pressure sensitive adhesives available from 3M Company or Avery Dennison/Fasson Division can be used. A suitable releasable adhesive 25, for example, is available under the trade designation Fasson R143 adhesive from Avery Dennison/Fasson Division. The adhesive can be directly applied to the under side of end portion 14 of the tab body 12. The adhesive 25 preferably has a thickness of about 0.0035 inches (0.089 mm). The adhesive can be covered with a conventional release liner, which for example, can be a silcone coated polyester film. The adhesive area is about the same size as cell surface 63 containing air holes 66. Once the release liner is removed, end 14 portion 14 of tab 10 is applied to cell surface 63 by pressing. The cells with tab affixed thereto are then packaged and are ready for sale. When it is desired to activate the cell, the user grasps handle 15 and peels the tab from the cell, thereby exposing the air holes and activating the cell. The R143 pressure sensitive adhesive exhibits good tack and adhesion and removes cleanly from cell surface 63 when tab handle 15 is lifted away from the cell.

Figure 4A:
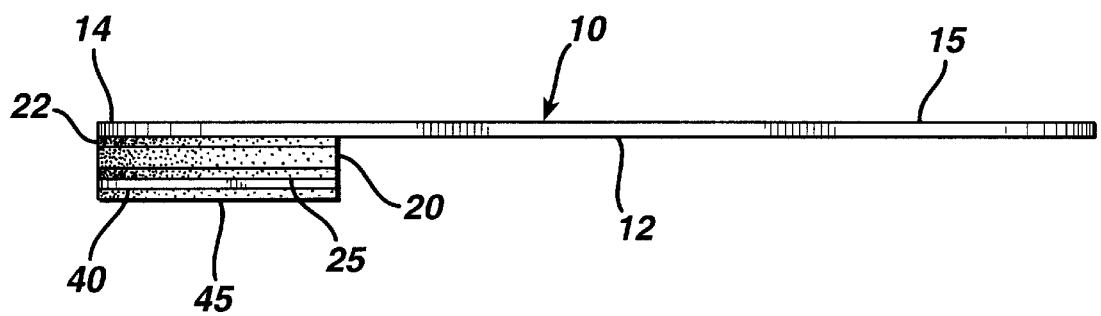
FIG. 4A is an elevation view of the tab shown in FIG. 4.
Figure 5A:
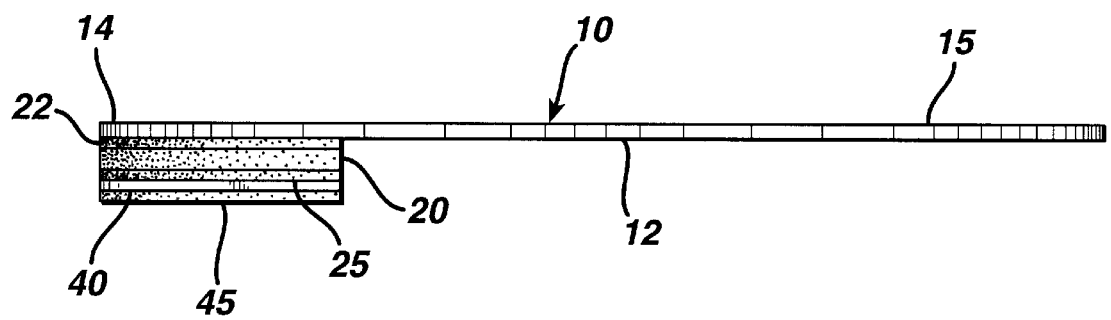
FIG. 5A is an elevation view of the tab shown in FIG. 5.

It has been further determined that the above described tab configuration can be improved by including an additional layer 20 between end portion 14 of tab body 12 and the pressure sensitive adhesive 25. The additional layer 20 is intended to cause end portion 14 to conform better to cell surface 63. As above described cell surface 63 can be flat or contoured and typically has line grooves 67 or other irregularities thereon in addition to the air holes 66. The additional layer 20 is of a resilient material. Desirably additional layer 20 can be of elastomeric or spongy material; preferably it is a polymeric foam material. The polymeric foam can be predominantly open cell or a closed cell foam. In particular the additional layer 20 can be polymeric foam such as a polyethylene foam. A desirable polymeric foam 20 is a high density polyethylene foam available under the trade designation "CACTUS" No. R4105 polyethylene foam from V-Himark Company. This material is available in the form of a foam tape precoated on each side with pressure sensitve adhesive. Such foam material 20 has a density of about 250 g/meter$^3$ and is heat resistance, that is, can be used within a wide range of service temperature, e.g between about −200° C. and 100° C. The foam material 20 (with adhesive layer on each side) can be applied at thickness of between about 0.010 and 0.040 inches (0.25 and 1.02 mm), preferably between about 0.015 and 0.040 inches (0.38 and 1.02 mm), for example, about 0.018 inches (0.45 mm) to the underside of tab body 12. The average foam cell size is between about 0.15 mm and 0.25 mm. Desirably, the foam layer 20 can be sized so that it has a surface area which is large enough to cover both the cell end surface 63 as well as the beveled or depressed portion 65 which forms an annular ring around surface 63 (FIG. 1A). The CACTUS polyethylene foam comes available in the form of a tape having as its core layer a polyethylene foam 20 which is precoated on its top and bottom side with an acrylic adhesive 22 and 25, respectively, as shown in FIGS. 2, 4A and 5A. The tape is provided with a polyolefin release liner covering each adhesive side. The polyethylene foam 20 is itself nonadhesive but is made adhesive by the coat of adhesive layers 22 and 25 thereon. Alternative foam materials having similar properties, for example, latex rubber, polypropylene, and polyurethane foam can also be employed for resilient layer 20.

After the release liner (not shown) is removed, the resilient or foam material 20 can be applied to the underside of end portion 14 of tab body 12. The adhesive layer 22 adheres the foam 20 to the underside of the tab body. Another film layer 40 such as a corona treated polyeolefin film available under the trade designation PRIMAX 350 from Avery Dennison/Fasson Division can be pressed onto the underside of foam 20 so that it adheres to adhesive layer 25 underlying foam 20. The PRIMAX 350 polyolefin film 40 can then be coated on its underside with a releasable pressure sensitive adhesive 45, desirably a releasable acrylic adhesive such as R143 adhesive from Avery Dennison/Fasson Division. The tab 10 can then be applied to cell surface 63 so that the adhesive layer 45 adheres end portion 14 of tab 10 to cell surface 63. The foam layer 20 covers the air holes 66 and together with underlying polyethylene layer 40 provides a tight seal over the air holes. When tab handle 15 is lifted, adhesive 45 releases cleanly thereby breaking the seal over the air holes 66. The tab is thus cleanly removed from the cell thereby exposing air holes 66 without leaving residue behind on cell surface 63.

In an alternative embodiment the polymeric layer 40 can be eliminated and the foam layer 20 adhered directly to the cell surface 63 thereby providing a tight seal covering air holes 66. In such embodiment the underlying surface of foam layer 20 can be coated with a releasable pressure sensitive adhesive 25. A preferred adhesive 25 can be a releasable acrylic adhesive available under the trade designation S1000 adhesive from Avery Dennison/Fasson Division. Although such embodiment provides a good seal over air holes 66, the best seal is provided when an additional polymeric film layer 40 is applied to the foam layer 20 underside with the exposed side of film layer 40 adhered to cell surface 63 as above described.

It has been determined that a number of advantages are realized when a resilient layer 20, preferably a polymeric foam, is added to the underside of tab body 12 at contact end 14. A resilient layer 20 composed of polymeric foam material 20, particularly, a polyethylene form allows the tab contact end 14 to conform more closely to the cell's domed end surface 63, whether flat or curved or containing surface irregularities such as grooves in addition to the air holes. The foam material allows the tab contact area with adhesive 25 to be enlarged to also cover the depressed or beveled annular ring surrounding cell end surface 63. Thus, the addition of foam layer 20 generally provides better conformity of the tab end portion 14 to the domed cell end surface 63 and also allows for greater useful adhesive contact area between tab end 14 and the cell contact surface.

The use of the additional foam layer 20 also can result in increased overall bonding strength between the tab body 12 and the cell end surface 63, even though the same pressure sensitive adhesive 25 is used, thereby assuring that air seepage into air holes 66 do not develop while the tab is adhered to the cell. It is conjectured that the increased adhesion may be due to greater surface to surface conformity enabled by the addition of the foam layer. Although the bonding strength between tab body 13 and the cell end surface 63 can be greater when the additional foam layer 20 is employed, the extended handle 15 of the preferred tab configuration (FIGS. 1, 4 and 5) provides the user with greater leverage when it is time to remove the tab form the cell. That is, the extended tab embodiments of the invention allows the user to exert less force to remove the tab from the cell than with conventional tabs even though there may be greater adhesion between the tab and cell. Thus, the preferred embodiments of the invention employ the combination of an extended tab configuration together with inclusion of the additional resilient layer 20, preferably a polymeric foam layer between the tab body 12 and the cell end surface 63. Such representative preferred embodiments are illustrated herein in FIGS. 1,2,4,4A, 5, and 5A.

Although the present invention was described with reference to specific embodiments, it should be appreciated that other embodiments are possible without departing from the concept of the invention. Thus, the invention is not intended to be limited to the specific embodiments but rather its scope is reflected in the claims and equivalents thereof.

What is claimed is:

1. A metal/air cell comprising a removable tab for covering air holes in a surface of said cell, wherein the tab comprises an elongated member and a resilient material attached thereto covering air holes in said cell surface, said resilient material comprising a polymeric foam layer between the surface of said cell having air holes and said elongated member, said tab being removably adhered to said cell surface.

2. The metal/air cell of claim 1 wherein a portion of the surface of said polymeric foam is adhered to at least a portion of one side of said elongated member.

3. The metal/air cell of claim 2 wherein said elongated member is stiff.

4. The metal/air cell of claim 3 wherein said elongated member comprises a polyester.

5. The metal/air cell of claim 1 wherein said foam is a polyethylene.

6. The metal/air cell of claim 2 wherein a polymeric film is adhered on one side to another portion of the surface of said foam material so that the foam material is between said polymeric film and said elongated member.

7. The metal/air cell of claim 6 wherein the opposite side of said polymeric film is coated with a releasable pressure sensitive adhesive.

8. The metal/air cell of claim 1 wherein said tab has an overall length of between about 22.8 and 30.5 mm.

9. The metal/air cell of claim 1 wherein said polymeric foam layer has a layer of adhesive on each side thereof forming a composite having a thickness of between about 0.010 and 0.040 inches (0.25 and 1.02 mm).

10. The metal/air cell of claim 1 wherein said foam material is attached to said elongated member along a minor portion of the length of said member, wherein a major portion of the length of said elongated member forms a handle for grasping.

11. The metal/air cell of claim 10 wherein said handle has a length of between about ½ and ¾ inches (12.7 and 19.1 mm).

12. The combination of a zinc/air cell and a tab removably adhered to a surface of said cell, the improvement comprising said tab comprising an elongated member and a resilient material adhered to at least a portion of one side of said elongated member, said resilient material covering air holes in the surface of said cell, said resilient material comprising a polymeric foam layer between the surface of said cell having air holes and said elongated member, said polymeric foam not being a pressure sensitive adhesive, said tab being removably adhered to said cell surface having air holes.

13. The combination of claim 12 wherein said zinc/air cell comprising a diameter between about 4 and 12 mm and a height between about 2 and 6 mm.

14. The combination of claim 12 wherein a portion of the surface of said polymeric foam is adhered to at least a portion of one side of said elongated member and another portion of the surface of said foam covers air holes in the surface of said cell.

15. The combination of claim 14 wherein a polymeric film is adhered on one side to another portion of the surface of said foam material so that the foam material is between said polymeric film and said elongated member and said polymeric material is adhered on its opposite side to the cell surface covering air holes therein.

16. The combination of claim 15 wherein said elongated member is stiff and comprises a polyester.

17. The combination of claim 12 wherein said foam is a polyethylene.

18. The combination of claim 15 wherein said polymeric film is adhered to said cell surface by a releasable adhesive.

19. The combination of claim 18 wherein said releasable adhesive is a pressure sensitive adhesive.

20. The combination of claim 12 wherein said tab has an overall length of between about 22.8 and 30.5 mm.

21. The combination of claim 12 wherein said polymeric foam layer has a layer of adhesive on each side thereof forming a composite having a thickness of between about 0.010 and 0.040 inches (0.25 and 1.02 mm).

22. The combination of claim 12 wherein said foam material is attached to said elongated member along a minor portion of the length of said member, wherein a major portion of the length of said elongated member forms a handle for grasping.

23. The combination of claim 22 wherein, said handle has a length of between about ½ and ¾ inches (12.7 and 19.1 mm).

\* \* \* \* \*